Nov. 25, 1969  J. J. FLAHERTY ET AL  3,480,002
MEDICAL ULTRASONIC SCANNING SYSTEM
Filed Jan. 24, 1967  4 Sheets-Sheet 1

INVENTORS
JOHN J. FLAHERTY
DONALD T. O'CONNOR
ATTORNEYS

FIG. 3

INVENTORS
JOHN J. FLAHERTY
DONALD T. O'CONNOR
ATTORNEYS

INVENTORS
JOHN J. FLAHERTY
DONALD T. O'CONNOR

ATTORNEYS

United States Patent Office 3,480,002
Patented Nov. 25, 1969

3,480,002
MEDICAL ULTRASONIC SCANNING SYSTEM
John J. Flaherty, Elk Grove Village, and Donald T. O'Connor, Barrington, Ill., assignors to Magnaflux Corporation, Chicago, Ill., a corporation of Delaware
Filed Jan. 24, 1967, Ser. No. 611,399
Int. Cl. A61b 6/12; H02n 9/00
U.S. Cl. 128—2                                    19 Claims

ABSTRACT OF THE DISCLOSURE

Medical ultrasonic system especially designed for breast examination, including pulse-echo transducer means moved in first and second transverse directions in a plane generally parallel to a patient's skin, the movement in the second direction being at a velocity of several times greater than that in the first direction. A C-scan indicating spot is deflected in synchronism with the transducer movements and its intensity is controlled by echo signals. A B-scan spot is deflected in one direction in synchronism with transducer pulsing and in a transverse direction in synchronism with the movement in the second direction. Additional features include the recording of the B-scan and C-scan indications by first and second cameras, a sector scan arrangement, a cathode ray tube having memory means and gate and gate control circuitry.

---

This invention relates to a medical ultrasonic system and more particularly to an ultrasonic pulse-echo system for examination of the interior of a patient's body, wherein indications are obtained which accurately portray the location of interfaces between tissues in the body, operative to reflect the ultrasonic waves. The system of this invention permits rapid examination of a patient and facilitates a quick and reliable diagnosis while being comparatively simple and compact in construction and trouble-free in operation.

Although having other applications, the system of this invention was particularly designed for the examination of breasts to determine the existence and location of tumors and the like. When malignant tumors are detected at an early stage, they can be surgically removed to prevent a reoccurrence. Such tumors are difficult to detect by X-ray techniques, because the indications may be obscured by the bone structure of the rib cage, and the repeated exposure of a patient to X-rays can cause serious damage.

Ultrasonic pulse-echo systems have heretofore been proposed for the examination of the interior of a patient's body. In one system proposed for breast examination, a transducer is moved over a breast while transmitting pulses of ultrasonic energy through a water couplant path into the breast and while receiving echoes from interfaces between tissues in the breast. In this system, a B-scan indication is obtained on the screen of a cathode ray tube, a scanning spot being deflected in one direction by a sawtooth wave synchronized with the pulsing of the transducer and being deflected in a transverse direction in synchronism with the transducer movement, with the intensity of the scanning spot being controlled from echo signals. With this system, it is possible to obtain a cross-sectional indication showing the internal structure, but the usefulness is limited due to the effects of extraneous or noise signals and due to difficulties of interpretation. The noise signals can be reduced by using a compound B-scan wherein a rapid oscillatory movement of the transducer is superimposed on a relatively slower scanning movement of the transducer, the indicating spot being moved in synchronism with the oscillatory movement. Improved operation is obtained from the use of this feature, but certain difficulties of interpretation remain. As a result, a considerable length of time has been required to examine each patient and to interpret the results, and it has been difficult to obtain an unequivocal diagnosis.

This invention was evolved with the object of overcoming the disadvantages of prior systems and of providing a system which would permit a rapid examination and make possible a quick and reliable diagnosis while being as simple and as compact as possible.

According to a very important feature of the invention, a medical ultrasonic system is provided for the examination of the interior of a patient's body incorporating C-scan indicating means, wherein a spot on a screen is deflected in transverse directions in synchronism with scanning movements of transducer means in a plane generally parallel to and adjacent the surface of the patient's skin, with signal transmission means being provided for applying echo signals to the indicating means to control the intensity of the scanning spot. With this feature, it is possible to obtain a plan view indication showing the interior configuration of a portion of a patient's body of considerable size. For example, the system can be used in the testing of a breast, with the nature of the interior of the entire breast being shown by one indication on the screen. Such an indication can be examined and a diagnosis can be made in a small fraction of the time required to examine and diagnose with prior systems.

According to another important feature of the invention, B-scan indicating means are combined with the C-scan indicating means, to produce a B-scan indication during each scanning movement of the transducer means in one direction. With this arrangement the C-scan indication can be examined to permit a rapid determination, in a matter of a few seconds, of whether there are any suspicious areas requiring further examination. If so, the B-scan indications can be examined to obtain an accurate and reliable diagnosis of the internal bodily construction.

A further very important feature of the invention relates to the provision of first and second camera means for photographing the B-scan and C-scan indications, the first camera means being operable after each scanning movement of the transducer means in one direction and the C-scan indicating means being operable after the scanning movement of the transducer means in the transverse direction. With this feature, the time required to examine a patient is very short, and the examining physician diagnostician can first examine the C-scan photograph to determine whether there are any areas of a suspicious nature. If there are no such areas, he need not examine the B-scan photographs. However, if there are areas of a suspicious nature in the C-scan photograph, he can then carefully examine the B-scan photographs. This arrangement has the further advantage that the B-scan photographs need not be developed unless and until the C-scan photograph is examined and shows areas of a suspicious nature.

A further very important feature of the invention relates to a compound C-scan arrangement wherein the transducer means is rapidly oscillated back and forth in one of the scanning directions, preferably in the direction used to develop the B-scan indication, such that both compound C-scan and compound B-scan indications are obtained. With the compound C-scan, it is possible to substantially obviate the effect of extraneous or noise signals as well as the effects of multiple reflections. This advantage arises because with the rapid oscillatory movement, the noise and multiple reflection signals are averaged and effectively cancel out, whereas signals from interfaces within the interior of the body reinforce one another as they are applied to the indicating screen. Accordingly, a clear and accurate indication is obtained of the position of such interfaces.

According to a specific feature of the invention, the rapid oscillatory movement is in the form of a pivotal movement, which is preferably about an axis transverse to the B-scan scanning movement. With this feature, the sound waves are impinged on interfaces from varying angles, to obtain a more accurate and distinct indication of the position thereof. In addition, the use of the pivotal movement minimizes turbulence in the water or other coupling liquid in which the transducer means is immersed.

Still another important feature of the invention relates to the attainment of movements of both the B-scan and C-scan indicating spots in accurate correlation to the movement of the transducer means. In accordance with this feature, a sawtooth deflection signal is developed in synchronism with the pulsing of the transducer means, the signal having a direction and magnitude corresponding to the back and forth oscillatory movement of the transducer means about its pivotal axis. Preferably, the sawtooth deflection signal is developed from a fixed amplitude sawtooth signal through resolver means controlled by the oscillatory movement. Additional features of the invention relate to arrangements for obtaining the required scanning movements, while providing a liquid couplant between the transducer means and the surface of the skin of the patient's body. In one preferred arrangement for breast examination, the patient lies back down and the breast is smeared with olive oil, petroleum jelly or the like while a water bag of vinyl or the like is placed over the breast, the transducer means being immersed in the water over the breast from a support structure above the patient. In another preferred arrangement, the patient lies stomach down on a table and the breast of interest extends down through an opening in the table into water in a tank under the patient, the transducer means being immersed in the tank and being supported from the supporting structure for the required scanning movements.

Still other features of the invention relate to specific mechanical, electrical and electronic means which provide a system which is highly accurate in operation, while being very reliable, and while being compact and relatively simple in construction.

This invention contemplates other and more specific objects, features and advantages which will become more fully apparent from the following detailed description taken in conjunction with the accompanying drawings which illustrate preferred embodiments and in which:

Reference numeral 10 generally designates a medical ultrasonic system constructed according to the principles of this invention, the system 10 being particularly designed for the testing of breasts, although having other applications.

Figure 1:
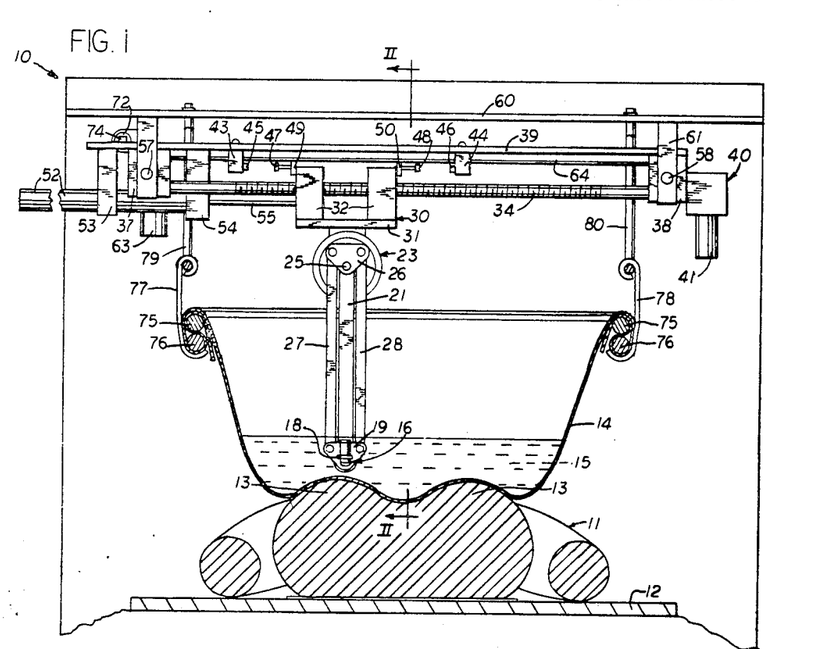
FIGURE 1 is a front elevational view, partly in section, of a scanning section of an ultrasonic system constructed according to the principles of this invention.

In the use of the system 10, a patient 11 lies back down on an examining table 12, and one or both of the patient's breasts 13 are smeared with olive oil, petroleum jelly or the like. A water bag 14 is placed over one or both of the breasts 13 and is partially filled with water or another liquid 15 to provide a couplant for transmission of ultrasonic waves. Preferably, the water bag 14 is of a thin vinyl material, the thickness being exaggerated in the drawing. A transducer 16 is immersed in the water 15 and is arranged to transmit pulses of ultrasonic waves downwardly through the water 15 and through the bag 14 into the breast, and to receive echoes from interfaces between tissues in the breasts.

The transducer 16 is supported for back and forth scanning movement in a horizontal direction and in a vertical plane transverse to the patient's spine, to move transversely across the entire breast. At the end of each such transverse scan, the transducer is moved through a short distance in a horizontal direction parallel to the patient's spine, so that after a number of the transverse scans, the entire breast is covered. By way of example, each movement parallel to the patient's spine may be on the order of two millimeters so that after approximately 50 scans, the breast is covered.

The transducer 16 is additionally supported for oscillatory movement about a horizontal axis transverse to the direction of the transverse scanning movement, and generally parallel to the patient's spine. With such oscillatory movement, it is possible to substantially obviate the effect of noise signals and the effects of multiple reflections, as will be clarified hereinafter.

Figure 2:
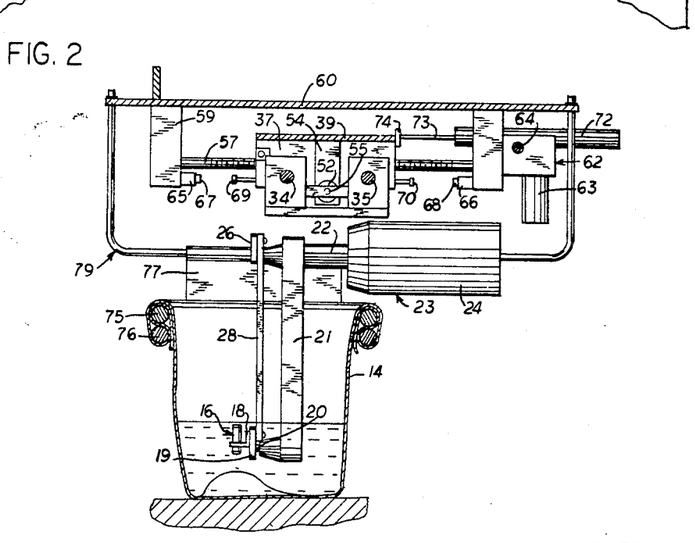
FIGURE 2 is a sectional view taken substantially along line II—II of FIGURE 1.

To support the transducer 16 for its oscillatory and scanning movements, it is secured by means of a bracket 18 to a plate 19 of generally triangular configuration, plate 19 being fixedly secured to a shaft 20 which is journaled by suitable bearings in a lower end portion of an upright support member 21. The upper end of the support member 21 in fixedly secured to a reduced diameter sleeve-like end portion 22 of a unit 23 having a generally cylindrical housing portion 24. A shaft 25 is journaled in the sleeve portion 22 and carries a plate 26 of generally triangular configuration, similar to the plate 19. Plate 26 is connected to the plate 19 through a pair of links 27 and 28 such that when the shaft 25 is oscillated about its axis by a motor of the unit 23, a corresponding oscillatory movement is imparted to the plate 19 and therefore to the transducer 16.

The unit 23 is supported from a carriage 30 which includes a plate 31 and four blocks extending upwardly from the four corner portions of the plate 30, A lead screw 34 is threaded through the two forward blocks 32, while a support shaft extends through the rearward two blocks 32.

The left-hand ends of the lead screw 34 and shaft 35 are carried by a block 37, while the right-hand ends of the lead screw 34 and shaft 35 are supported by a block 38, with the blocks 37 and 38 being secured to the underside of a plate 39. The block 38 supports a unit 40 which includes an electric motor 41 mechanically coupled to the lead screw 34 to rotate the lead screw 34 and move the carriage 34 in a horizontal direction transverse to the patient's spine. In operation of the system, the carriage 30 is moved at a uniform speed in one direction until it reaches one limit of travel and then is moved in the reverse direction at the same rate of speed until it reaches an opposite limit. To control the limits of movement, a pair of limit switches 43 and 44 are supported on the underside of the plate 39 and have actuators 45 and 46 engageable by members 47 and 48 which are carried by plates 49 and 50 secured to the blocks 32. The members 47 and 48 may preferably be in the form of screws threaded through the plates 49 and 50, to permit adjustment. In addition, the limit switches 43 and 44 may be adjustable longitudinally along the plate 39, in a direction parallel to the axis of the lead screw 34.

Means are also provided for electrically sensing the position of the carriage 30. In particular, a linear potentiometer unit 52 is provided which is supported from the plate 39 through depending support members 53 and 54, the unit 52 having a control rod 55 the end of which is secured to a plate 56 on the carriage 30.

The blocks 37 and 38, together with the plate 39, form a carriage which is movable in the horizontal direction transverse to the axis of the lead screw 34. In particular, the blocks 37 and 38 are respectively supported by a pair of lead screws 57 and 58, the ends of lead screw 57 being journaled and carried by a pair of members 59, depending from the horizontal overhead plate 60, and the lead screw 58 being similarly supported from a pair of members 61, depending from the plate 60.

The lead screw 57 is driven by a unit 62 which includes an electric motor 62 mechanically coupled to the lead screw 57 through suitable gearing. A shaft 64 has one end coupled through suitable bevel gears to the shaft 57 and an opposite end coupled through similar gears to the shaft 58, so that both shafts 57 and 58 are driven together.

To determine the limits of travel along the lead screws 57 and 58, a pair of limit switches 65 and 66 are supported on the members 59 and have actuators 67 and 68 engageable by members 69 and 70 on the block 37, members 69 and 70 preferably being screw members threaded into the block 37, to provide for adjustment.

To electrically sense the position of the block 37 on the lead screw 57, a linear potentiometer unit 72 is supported on one of the blocks 59 and has a control rod 72 the end of which is secured to a plate 74 on the block 37.

It is here noted that to provide for adjustable support of the bag 14, a pair of generally rectangular frame members 75 and 76 are provided, the upper edge portion of the bag 14 being extended outwardly over the frame member 75 then downwardly under the member 76, then upwardly and outwardly between the members 75 and 76 and then upwardly and inwardly around member 75, so that the weight of the water or other liquid in the bag 14 forces the member 75 downwardly to pinch the material of the bag 14 between the members 75 and 76. The assembly is supported by a pair of hangars 77 and 78 which are supported on the bight portions of U-shaped rods 79 and 80 which are supported from the plate 60.

Figure 3:
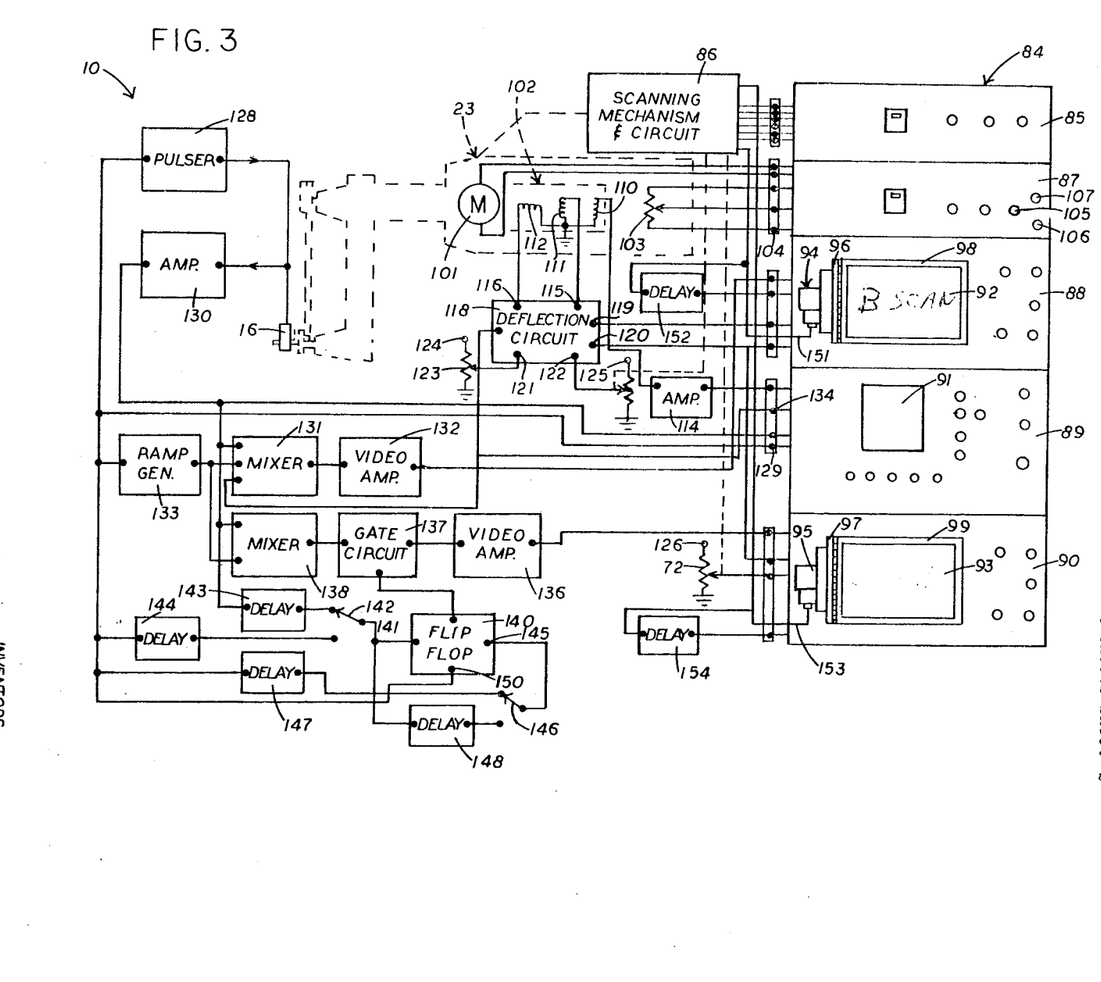
FIGURE 3 is a schematic diagram showing an indicating section of the system and showing electrical and electronic circuitry of the system.

Referring now to FIGURE 3, the system 10 further includes an instrument section 84 which includes a unit 85 for controlling the scanning mechanism and a circuit therefor, indicated by block 86 in FIGURE 3, a unit 87 for controlling the oscillating unit 23, a B-scan indicating unit 88, an A-scan indicating unit 89 and a C-scan indicating unit 90.

The A-scan indicator unit 89 includes a cathode ray tube having a face or screen 91. A spot of light produced on the screen 91 is deflected horizontally by a sawtooth wave synchronized with pulsing of the transducer 16, while received echo signals are used to deflect the spot in a vertical direction, to produce "pips" on the screen 91. The positions of such pips, measured from the left side of the screen 91, are measures of the depth within the body of the interfaces producing the echo signals.

The B-scan unit 88 includes a cathode ray tube having a face or screen 92 on which a pattern is produced corresponding to a cross-section of the portion of the body scanned by the transducer 16. To produce such a cross-sectional pattern, a spot on the screen 92 is deflected in synchronism with the pulsing of the transducer to produce traces on the screen 92, preferably starting at a point adjacent the upper edge of the screen and moving downwardly, while the position of the trace is controlled in accordance with the position of the transducer 16 during oscillation thereof. The intensity of the spot, meanwhile, is controlled in response to the echo signals developed by the transducer 16.

The C-scan unit 90 includes a cathode ray tube having a face or screen 93 on which a pattern is produced in the form of a plan view indication of a portion of the body scanned by the transducer 16. To produce the plan view pattern, a spot on the screen 93 is deflected in one direction, preferably horizontally, in accordance with the movement of the carriage 30 along the lead screw 34 and is deflected in a transverse direction, preferably vertically, in accordance with the movement of the blocks 37 and 38 on the lead screws 57 and 58. Echo signals produced from interfaces within a certain range of depths within the body are used to intensify the spot on the screen 93. The cathode ray tube of the C-scan unit 90 is preferably a memory tube which functions to retain an image thereon indefinitely, until an erase signal is applied. This feature is advantageous because it may take a considerable length of time, on the order of four minutes for example, to complete a scanning operation. The cathode ray tube of the B-scan unit 88 may also be a memory tube.

In accordance with a very important feature of the invention, cameras 94 and 95 are provided for photographing the B-scan and C-scan indications, the cameras 94 and 95 being preferably mounted on covers 96 and 97 which are hinged to the outer edges of side wall portions of rectangular light shrouds 98 and 99 extending outwardly from around the screens 92 and 93. The covers 96 and 97 are illustrated in open positions and it will be understood that they are of a size such that they close the outer ends of the shrouds 98 and 99 when moved inwardly to closed positions.

The oscillating unit 23 comprises a motor 101, a resolver 102 and a potentiometer 103 which are disposed within the housing portion 24 and which are mechanically connected to the shaft 25. To control oscillation of the transducer 16, the motor 101 and the potentiometer 103 are connected to terminals of a board or jack 104 of the control unit 87 which although having a number of desirable and advantageous features, forms no part of the present invention and is therefore not described or illustrated in detail. It may be noted, however, that the unit 87 includes an adjustable speed control knob 105, an angle control knob 106 which controls the angle of the oscillatory movement of the transducer 16, and an attitude control knob 107 which controls the mean angle of the oscillatory movement.

The resolver 33 is effective to translate angular movement of the shaft 25 into electrical signals for correlating indications on the screens 92 and 93 with the oscillation of the shaft 25, and thus with the oscillation of the transducer 16. In particular, the resolver 102 includes a stator coil 110 and a pair of rotor coils 111 and 112 located at right angles to each other and inductively coupled to the stator coil 110, to generate signals having sine and cosine functions of a signal applied to the stator coil 110.

Stator coil 110 is connected between ground and an output terminal of an amplifier 114 having an input terminal connected to an output terminal of the A-scan unit 89. An internal sweep circuit of the unit 89 operates to generate a sawtooth signal of fixed amplitude which is amplified by the amplifier 114 and applied to the stator coil 110. The rotor coils 111 and 112 then develop corresponding sawtooth signals, having amplitudes which are sine and cosine functions of the angular position of the transducer 16. It will be understood, of course, that the system may use forms of resolvers other than the inductive type resolver illustrated.

Rotor coils 111 and 112 are respectively coupled to input terminals 115 and 116 of a deflection circuit 118 having output terminals 119 and 120 connected to terminals of the B-scan unit 88, terminal 119 being also connected to a terminal of the C-scan unit 90. The terminals 119 and 120 are thus connected directly or through amplifier circuits in the unit 88 to the horizontal and vertical deflection plates or coils of the cathode ray tube therein. In the system as illustrated, the terminal 119 is connected to the horizontal deflection circuit of the unit 88 and is controlled from the signal developed by the rotor coil 111, while terminal 120 is connected to the vertical deflection circuit and is controlled by the signal from coil 112. Terminal 119 is also connected to a horizontal deflection circuit of the C-scan unit so that the horizontal deflection in the C-scan unit corresponds with that in the B-scan unit.

The system may be operated in a manner such that with the axis of the transducer 16 in a vertical position, the coil 111 is at right angles to the stator coil 110, so that no signal is applied to the horizontal deflection circuit, while the coil 112 is aligned with the stator coil 110 to generate a maximum signal which is applied to the vertical deflection circuit of the B-scan unit 88. A vertical trace is then developed on the screen 92 starting at an apex point adjacent the upper edge thereof and moving downwardly under control of the sawtooth sweep signal. With the transducer 16 moving away from the vertical position, signals are then developed by the rotor coil 111 which is applied to cause a sawtooth horizontal deflection signal of small amplitude to be applied to the horizontal deflection circuit along with the larger amplitude vertical deflection signal. The trace then moves angularly downwardly and either to the left or to the right depending upon the direction of displacement of the transducer away from the vertical position. With further movement away from the vertical position, the amplitude of the horizontal deflection signal is increased, while the amplitude of the vertical deflection signal is decreased, so that the position of the trace on the screen 92 accurately corresponds to the angular position of the transducer 16.

Accordingly, when the transducer 16 is oscillated, a trace is produced on the screen 92 which is caused to sweep through an arc about an apex adjacent the upper edge of the screen 92, to produce a sector scan indication. The position of the apex point is controlled by voltage applied to terminals 121 and 122 of the deflection circuit 118. The vertical position of the apex is controlled by the voltage of terminal 121 which is connected to the movable contact of a potentiometer 123 connected between ground and a power supply terminal 124. The horizontal position is controlled by the voltage of terminal 122 which is connected to the movable contact of the linear potentiometer unit 52 which as above described is controlled by the position of the carriage 30. Potentiometer 52 is connected between ground and a power supply terminal 125.

To control vertical deflection in the C-scan unit 90, the movable contact of the linear potentiometer 72 is connected to the vertical deflection circuit of the C-span unit 90, potentiometer 72 being connected between ground and a power supply terminal 126. It will be appreciated that the B-scan and C-scan units 88 and 90 may include suitable positioning control circuits for applying suitable bias signals such that the respective patterns are accurately centered on the screens 92 and 93.

The transducer 16 is connected to the output of a pulser 128 having an input connected to a terminal 129 of the A-scan unit 89, a timing signal being generated at terminal 129 by timing the sweep generating circuitry of a type conventional in the oscilloscope art, within the unit 89. The sawtooth signal applied through the amplifier 114 to the stator coil 110 of the resolver 102 is synchronized with the timing signal developed at terminal 129.

The transducer 16 is additionally connected to an input terminal of an amplifier 130 having an output terminal connected to an input terminal of a mixer 131 the output of which is applied through a video amplifier 132 to a video input terminal of the B-scan unit 88, such that echo signals are applied either directly or through an amplifier in the unit 88 to the grid of the cathode ray tube therein, to intensify the electron beam and brighten the scanning spot in response to the echo signals.

The mixer 131 has a second input terminal connected to the output of a ramp generator 133 having an input connected to the timing pulse terminal 129 of the A-scan unit 89. The ramp generator 133 is of the type known in the radar art and applies a signal to increase the amplification of echo signals in proportion to the distance from the transducer so as to compensate for attenuation of signals and also to compensate for the fact that with the sector scan, the separation of trace lines increases in proportion to the distance from the transducer.

A third input terminal of the mixer is connected to a terminal 134 of the A-scan unit 89, for application of an unblanking signal thereto.

To apply a video signal to the C-scan unit 90, a video signal input terminal thereof is connected to the output of a video amplifier 136 having an input connected through a gate circuit 137 to the output of a mixer 138 having inputs connected to outputs of the amplifier 130 and the ramp generator 133. The gate circuit 137 is controlled by a flip-flop 140 which is triggered "on" at a certain time following each pulsing of the transducer 16 and which is triggered "off" at a subsequent time. An arrangement is provided which allows for selective control of the triggering of the flip-flop 140 in accordance with the particular testing conditions. In particular, an input terminal 141 of the flip-flop 140 is connected to a selector switch 142, for selective connection either to the output of a delay circuit 143 or to the output of a delay circuit 144. Delay circuit 143 is connected to the output of the amplifier 130 and when the delay circuit 143 is operative, the first echo signal, from the "front" surface of the body being inspected, is operative to trigger the flip-flop 140 "on," after a certain delay, which may preferably be of comparatively short duration. This feature is particularly desirable in the examination of breasts, wherein the surface may be at varying distances from the transducer.

The input of delay circuit 144 is connected to the timing pulse output terminal 129 of the A-scan unit 89, and, when operative, is effective to trigger the flip-flop 140 "on" a certain time interval after the timing pulse is applied. This arrangement is desirable when the front boundary of the region to be inspected is generally parallel to the path of movement of the transducer.

To trigger the flip-flop 140 "off," a terminal 145 thereof is connected to a selector switch 146, for selective connection either to the output of a delay circuit 147 or a delay circuit 148. The input of delay circuit 147 is connected to the timing pulse output terminal 129 of the A-scan unit and, when used, is operative to trigger the flip-flop 140 "off" after a certain fixed delay following the timing pulse. This operation is particularly desirable in the testing of breasts, in that the delay provided by delay circuit 147 may be such as to eliminate reflections from the rib cage, which is at a substantially fixed distance from the transducer 16 during the scanning movement thereof.

The input of delay circuit 148 is connected to the selector switch and when delay circuit 148 is operative, the time duration of the operation of the flip-flop 140 is constant. This type of operation is desirable wherein the region to be inspected has a substantially fixed thickness.

Each of the delay circuits 143, 144, 147 and 148 may preferably be in the form of a monostable multivibrator operative to generate a signal at a certain time following application of a triggering signal thereto, and appropriate threshold circuits may be included in the inputs of the delay circuits.

To insure that the flip-flop 140 is always reset to its "off" condition at the beginning of each transmission of an ultrasonic pulse, a reset input terminal 150 thereof is connected to the timing pulse output terminal 129 of the A-scan unit 89.

The scanning mechanism and circuit 86 operates to supply signals for operation of the cameras 94 and 95 and also for erasure of the images on the screens 92 and 93 of the cathode ray tubes in the B-scan and C-scan units 88 and 90, such cathode ray tubes being preferably memory tubes, as above indicated. In particular, an output line 151 of the scanning mechanism and circuit 86 is connected to the camera unit 94 to apply a triggering signal thereto. The camera unit 94 includes conventional apparatus to close the camera shutter in response to the application of each triggering pulse, and to also advance the film to condition the camera for exposure of another frame of the film, the camera shutter being then reopened. Line 151 is additionally connected to the input of a delay circuit 152 having an output connected to an input of the B-scan unit 88, to apply an erase signal to the cathode ray tube thereof.

Similarly, an output line 153 of the scanning mechanism and circuit 86 is connected to the camera 95 and also to the input of a delay circuit 154 having an output connected to an erase signal input terminal of the C-scan unit 90.

Figure 4:
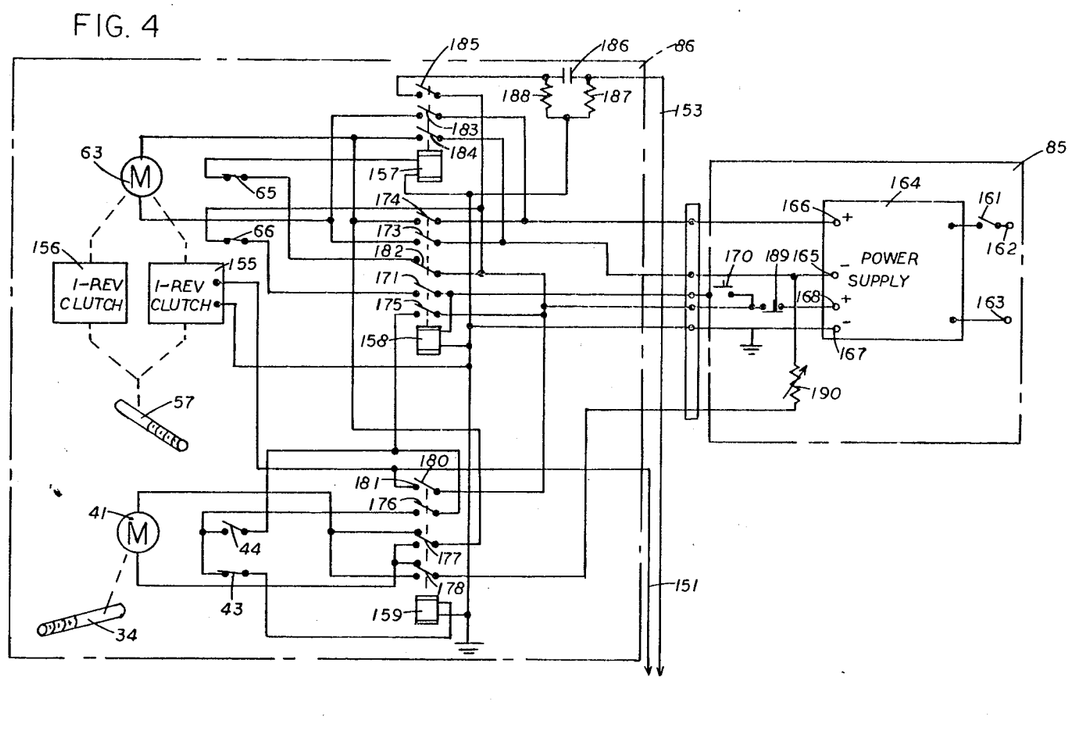
FIGURE 4 is a schematic diagram of a scanning mechanism and associated circuitry of the system.

FIGURE 4 illustrates the arrangement of the scanning mechanism and circuit 86 and also of the control unit 85. Referring thereto, the C-scan motor 63 is connected through a one-revolution clutch 155 to the lead screw 57 to rotate the lead screw 57 through one revolution, when a triggering signal is applied to the one-revolution clutch 155. The motor 63 is additionally connected through a one-revolution clutch 156 to the lead screw 57 to rotate the lead screw 57 in the reverse direction, when the motor 63 is reversed. As above noted, the lead screw 58 is rotated in unison with the lead screw 57.

The motor 63 is preferably a reversible DC motor, and the motor 41 is also preferably a DC motor, directly coupled to the lead screw 34.

In the general operation of the system, the motor 41 is energized in one direction until the limit switch 43 is actuated, whereupon the motor 41 is reversed to operate the lead screw 34 in the reverse direction until the limit switch 44 is operated, whereupon the motor 41 is again reversed. On each reversal of the motor 41, the one revolution clutch 155 is triggered to rotate the lead screw 57 through one revolution. When a scanning operation is completed, the limit switch 66 is actuated, to reverse the direction of rotation of the motor 63 and to drive the lead screws 57 and 58 in the reverse direction through the one-revolution clutch 156. Thus the elements are rapidly returned to the initial positions thereof.

The control system includes three relays 157, 158 and 159, each having a plurality of contacts, and the arrangement will be described with reference to the sequence of operation thereof.

To initiate operation of the system, an on-off switch 161 is closed to cause application of power from power input terminals 162 and 163 to a DC power supply 164 which has its output terminals 165 and 166 for supplying power for operation of the motors 41 and 63 and which has output terminals 167 and 168 for supplying power for operation of the relays 157, 158 and 159.

To initiate a scanning operation, a push button switch 170 is closed to connect terminal 168 to one terminal of relay 158, the other terminal of relay 158 being connected to the power supply terminal 167. When relay 158 is energized, a holding contact 171 is closed to complete a circuit through the limit switch 66 and to maintain energization of the relay 158 when the push button switch 170 is released. When relay 158 is energized, a pair of contacts 173 and 174 are closed to connect the motor 63 to the power supply terminals 165 and 166 so as to cause operation of the motor 63 in one direction, such that the lead screws 57 and 58 are rotated when the one-revolution clutch 155 is triggered. Another contact 175 of the relay 158 is closed to apply current for operation of the relay 159. When relay 158 is energized, current for operation of the B-scan motor 41 is supplied through the contact 174. When relay 159 is deenergized and its contacts are in the positions as illustrated, the motor 41 is energized in one direction, to drive the carriage 30 to the right as viewed in FIGURE 1. When the carriage reaches the limit of its travel in the right-hand direction, the limit switch 44 is closed to energize the relay through the limit switch 43 which is normally closed and which opens only at the limit of the travel of the carriage 30 to the left. When relay 159 is energized, a holding contact 176 is closed to maintain the energization thereof when the limit switch 44 is opened upon movement of the carriage 30 to the left. Reversing contacts 177 serve to so energize the motor 41 as to move the carriage to the right when the relay 159 is deenergized and to move the carriage 30 to the left when the relay 159 is energized. At the limit of the left-hand travel, the limit switch 43 is opened to deenergize the relay 159, the motor being then energized in the reverse direction after which the switch 43 is closed.

Each time that the relay 159 is either energized or deenergized, a contact 180 thereof momentarily engages a blade contact 181 to apply a short pulse to the clutch 155 and also to apply the pulse to the line 151, connected to the B-scan camera 94. The shutter of the camera 94 is then closed and the film is advanced, after which the shutter is again opened.

When the blocks 37 and 38 reach the limit of travel in a rearward direction, the limit switch 66 is opened to deenergize the relay 158, whereupon the relay 157 is energized through the limit switch 65 and through a contact 182 of the relay 158. Contacts 183 and 184 of the relay 157 are then closed to energize the motor 63 in a reverse direction to move the blocks 37 and 38 forwardly through the one-way clutch 156, such movement being effected quite rapidly. At the limit of the forward travel, the switch 65 is open to deenergize the relay 157, so that both relays 157 and 158 are then deenergized until another cycle is initiated through closure of the push button switch 170.

When relay 157 is energized, a contact 185 thereof is closed to apply a momentary pulse to the line 153 through a capacitor 186, a resistor 187 being connected between line 153 and ground. The capacitor 186 and resistor 187 have a relatively short time constant, to obtain a pulse of the required duration for operation of the camera 95. A resistor 188, having a relatively high value, provides a discharge path for the capacitor 186.

When the pulse is applied to the camera 95, the shutter is closed and the film is advanced, after which the shutter is re-opened. The shutter is preferably open during the entire C-scan operation.

It is noted that a stop button 189 is connected between the power supply 164 and the relays, to deenergize the same and stop operation whenever desired. Also, it noted that an adjustable resistor 190 may be connected between power supply terminal 165 and the relay contact 178, for controlling the speed of operation of the motor 41.

Figure 5:
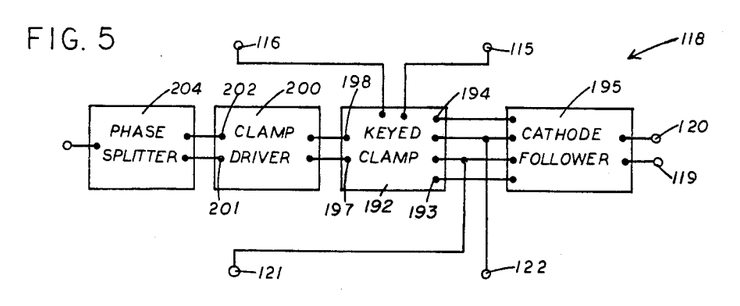
FIGURE 5 is a block diagram of a deflection circuit of the circuitry shown in FIGURE 3.

FIGURE 5 shows in block form the deflection circuit 118. A keyed clamp circuit 192 is provided having input terminals connected to the terminals 115 and 116 which are connected to the rotor coils 111 and 112 and having a pair of output terminals 193 and 194 connected to input terminals of a cathode follower circuit 195 having output terminals connected to the terminals 119 and 120. The keyed clamp circuit 192 operates to fix the signal level at the output terminals 193 and 194 during time intervals between applied sawtooth signals. To control operation of the keyed clamp circuit 192, input terminals 197 and 198 thereof are connected to output terminals of a clamp driver circuit 200 having input terminals 201 and 202 connected to output terminals of a phase splitter circuit 204 which has an input terminal connected to the unblanked signal output terminal 134 of the A-scan unit 89. The phase splitter 204 operates to apply squarewave signals of opposite polarity to the clamp driver circuit 200 which in turn operates the keyed clamp circuit 192 to fix the levels during time intervals between the sawtooth signals. The levels at which the signals are fixed are controlled by the signals on terminals 121 and 122 which are connected to terminals of the keyed clamp circuit 192 and also to terminals of the cathode follower circuit 195.

Figure 6:
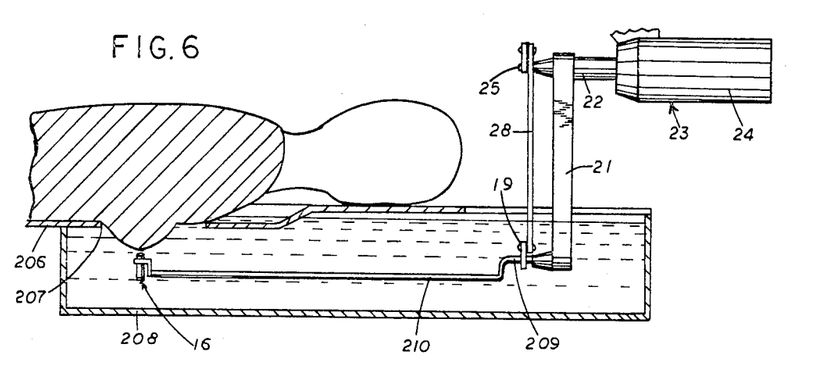
FIGURE 6 is a view showing a modified scanning arrangement.

FIGURE 6 illustrates a modified scanning arrangement wherein the patient lies face down on a table 206 having an opening 207 through which the patient's breasts may extend, the table being disposed over a tank 208 which is filled with water to provide a fluid couplant path. The transducer 16 is supported at the end of a shaft 209 which is substituted for the shaft 20 and which may preferably have an offset portion 210. The overall operation of this arrangement is substantially the same as that of the first system above described.

It will be understood that modifications and variations may be effected without departing from the spirit and scope of the novel concepts of this invention.

We claim as our invention:

1. In a medical ultrasonic system for the examination of the interior of a patient's body, pulse-echo means including transducer means for periodically sending pulses of ultrasonic waves through the patient's skin and into the patient's body and for receiving reflections from interfaces between tissues of the body to develop echo signals, means supporting said transducer means for movement in first and second generally transverse directions in a plane generally parallel to an adjacent surface of the patient's skin, drive means for effecting scanning movements of said transducer means in said first and second directions, C-scan indicating means including a screen and means for producing an indicating spot on said screen, deflection means for effecting scanning movements of said spot in generally transverse directions in synchronism with the scanning movements of said transducer means, and signal transmission means for applying said echo signals to said indicating means to control the intensity of said scanning spot, said drive means including first means for effecting movement in said first direction at a first velocity, and second means for effecting movement in said second direction at a second velocity several times greater than said first velocity.

2. In a medical ultrasonic system as defined in claim 1, B-scan indicating means including a screen and means for producing an indicating spot on said screen, B-scan deflection means for deflecting said B-scan indicating spot in one direction in synchronism with the pulsing of said transducer means and in a transverse direction in synchronism with the movement of said transducer means in said second direction.

3. In a medical ultrasonic system as defined in claim 2, first camera means for photographing said B-scan screen during each scanning movement of said transducer means in said second direction, and second camera means for photographing said C-scan indicating means during each scanning movement of said transducer means in said first direction.

4. In a medical ultrasonic system as defined in claim 2, said drive means further including third means for effecting rapid back and forth movement in a plane generally transverse to the adjacent surface of the patient's skin.

5. In a medical ultrasonic system as defined in claim 4, said deflection means including means for effecting rapid back and forth movement of said scanning spot in synchronism with said back and forth movement of said transducer means.

6. In a medical ultrasonic system as defined in claim 4, said plane of said back and forth movement being transverse to said first direction.

7. In a medical ultrasonic system as defined in claim 4, said rapid back and forth movement being effected about an axis generally parallel to the adjacent surface of the patient's skin.

8. In a medical ultrasonic system as defined in claim 7, deflection control means for producing a sawtooth deflection signal synchronized with the pulsing of said transducer means and having a direction and magnitude corresponding to the back and forth movement of said transducer means about said axis, and means for applying said sawtooth deflection signal to said deflection means.

9. In a medical ultrasonic system as defined in claim 8, said deflection control means including means for producing a fixed amplitude sawtooth signal synchronized with the pulsing of said transducer means, and resolver means responsive to said fixed amplitude sawtooth signal and controlled by said back and forth movement to produce said sawtooth deflection signal.

10. In a medical ultrasonic system as defined in claim 9, said resolver means being an inductive resolver having stator and rotor coils, said fixed amplitude sawtooth signal being applied to one of said coils and said sawtooth deflection signal being developed by the other of said coils.

11. In a medical ultrasonic system as defined in claim 1, said C-scan indicating means being a cathode ray tube.

12. In a medical ultrasonic system as defined in claim 11, said cathode ray tube having memory means for retaining an image on said screen for a length of time at least equal to the time required for one complete scanning movement of said transducer means, and means for erasing said image prior to the start of each complete scanning movement of said transducer means.

13. In a medical ultrasonic system as defined in claim 1, said signal transmission means including gate means, and gate control means for enabling said gate means only at certain time intervals following the sending of said pulses, whereby the indication produced on said screen corresponds to echoes from interfaces between tissues within certain selected regions within the patient's body.

14. In a medical ultrasonic system as defined in claim 13, wherein a liquid coupling medium is disposed between said transducer means and the skin of the patient's body to allow movement of said transducer means without contact with the patient's skin, said gate control means including means for responding to a first echo signal developed by reflection from the skin of the patient's body, and delay means responsive to said first echo signal for enabling said gate means at a certain time following receipt of said first echo signal.

15. In a medical ultrasonic system as defined in claim 14, second delay means responsive to pulsing of said transducer means for disabling said gate means at a certain time following pulsing of said transducer means.

16. In a medical ultrasonic system as defined in claim 15, said system being adapted for breast examination, and said second delay means being effective to disable said gate means prior to receipt of echoes from the rib cage of the patient's body.

17. In an ultrasonic system for the examination of an object, pulse-echo means including transducer means for periodically sending pulses of ultrasonic waves into the object and for receiving reflections from inhomogeneities in the object, means supporting said transducer means for movement in first and second generally transverse directions, drive means for effecting scanning movements of said transducer means in said first and second directions, C-scan indicating means including a screen and means for producing an indicating spot on said screen, deflection means for effecting scanning movements of said spot in generally transverse directions in synchronism with the scanning movements of said transducer means, signal transmission means for applying said echo signals to said indicating means to control the intensity of said scanning spot, said drive means including first means for effecting movement in said first direction at a first velocity, second means for effecting movement in said second direction at a second velocity several times greater than said first velocity, and third means for effecting rapid back and forth movement in a plane parallel to said second direction and generally transverse to the adjacent surface of the object, and said deflection means including means for effecting rapid back and forth movement of said scanning spot in synchronism with said back and forth movement of said transducer means.

18. In an ultrasonic system as defined in claim 17, said rapid back and forth movement being effected about an axis generally parallel to the adjacent surface of the object.

19. In an ultrasonic system as defined in claim 18, said deflection means including means for producing a sawtooth deflection signal synchronized with the pulsing of said transducer means and having a direction and magnitude corresponding to the back and forth movement about said axis.

References Cited

UNITED STATES PATENTS

| | | | |
|---|---|---|---|
| 3,086,390 | 4/1963 | Brown | 128—24.05 |
| 3,156,110 | 11/1964 | Clynes | 73—67.8 |
| 3,237,623 | 3/1966 | Gordon. | |
| 3,280,622 | 10/1966 | Carlin. | |
| 3,308,652 | 3/1967 | Appel et al. | |

WILLIAM E. KAMM, Primary Examiner

U.S. Cl. X.R.

310—9.1